(12) United States Patent
Tang

(10) Patent No.: US 8,434,986 B2
(45) Date of Patent: May 7, 2013

(54) WASHER

(75) Inventor: Zi-Ming Tang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 377 days.

(21) Appl. No.: 12/861,044

(22) Filed: Aug. 23, 2010

(65) Prior Publication Data

US 2011/0123297 A1    May 26, 2011

(51) Int. Cl.
*F16B 43/00*    (2006.01)

(52) U.S. Cl.
USPC .......... 411/535; 411/143; 411/174; 411/538; 411/547

(58) Field of Classification Search .......... 411/111–113, 411/131, 143, 147, 174, 535, 538, 540, 547, 411/970
See application file for complete search history.

(56) References Cited

U.S. PATENT DOCUMENTS

| | | | | |
|---|---|---|---|---|
| 3,123,880 A * | 3/1964 | Barry et al. | .................. | 411/352 |
| 3,329,190 A * | 7/1967 | Oldenkott | .................... | 411/136 |
| 3,340,494 A * | 9/1967 | Gutshall | ...................... | 439/434 |
| 3,921,686 A * | 11/1975 | Markey | .......................... | 411/167 |
| 4,074,491 A * | 2/1978 | Bell et al. | ........................ | 52/394 |
| 4,219,064 A * | 8/1980 | Lozano | .......................... | 411/103 |
| 4,684,305 A * | 8/1987 | Dubost | .......................... | 411/174 |
| 4,778,321 A * | 10/1988 | Okawa | .......................... | 411/523 |
| 5,339,500 A * | 8/1994 | Muller et al. | .................. | 24/514 |
| 5,893,694 A * | 4/1999 | Wilusz et al. | ................. | 411/112 |
| 5,961,264 A * | 10/1999 | Postadan | ....................... | 411/174 |
| 5,967,724 A * | 10/1999 | Terry | ............................. | 411/149 |
| 6,131,252 A * | 10/2000 | Hoheisel et al. | ............... | 24/514 |
| 6,854,941 B2 * | 2/2005 | Csik | .............................. | 411/112 |
| 6,918,725 B2 * | 7/2005 | Gauron | .......................... | 411/112 |
| 7,168,902 B2 * | 1/2007 | Terry | ............................. | 411/160 |
| 2008/0095592 A1 * | 4/2008 | Spitz | ............................. | 411/174 |
| 2008/0310931 A1 * | 12/2008 | Csik et al. | ..................... | 411/103 |

* cited by examiner

*Primary Examiner* — Roberta Delisle
(74) *Attorney, Agent, or Firm* — Altis Law Group, Inc.

(57) ABSTRACT

A washer includes a wedge-shaped main body, a wedge-shaped adjusting portion moveably positioned on the main body and a flexible connecting portion interconnecting the main body and the adjusting portion. The main body defines a through hole through which the screw passes. The main body includes a bottom surface and a positioning surface angled relative to the bottom surface. The adjusting portion includes a flat contact surface and a latching surface contacting the positioning surface of the main body. The latching surface is angled relative to the contact surface. A wedge angle of the adjusting portion equals that of the main body, thus the bottom surface of the main body is substantially parallel with the contact surface of the adjusting portion.

4 Claims, 4 Drawing Sheets

WASHER

BACKGROUND

1. Technical Field

The present disclosure relates to a washer.

2. Description of the Related Art

A washer is often needed when a mounting board is fixed on a base body of an electronic device using a plurality of screws or other connecting members. The washer fills a gap between the mounting board and the base body to firmly secure the mounting board. However, commonly used washers have a fixed height, while the size of the gap can change due to different mounting boards or electronic devices, thus canceling the benefit of the washer.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the views, and both the views are schematic.

DETAILED DESCRIPTION

Figure 1:
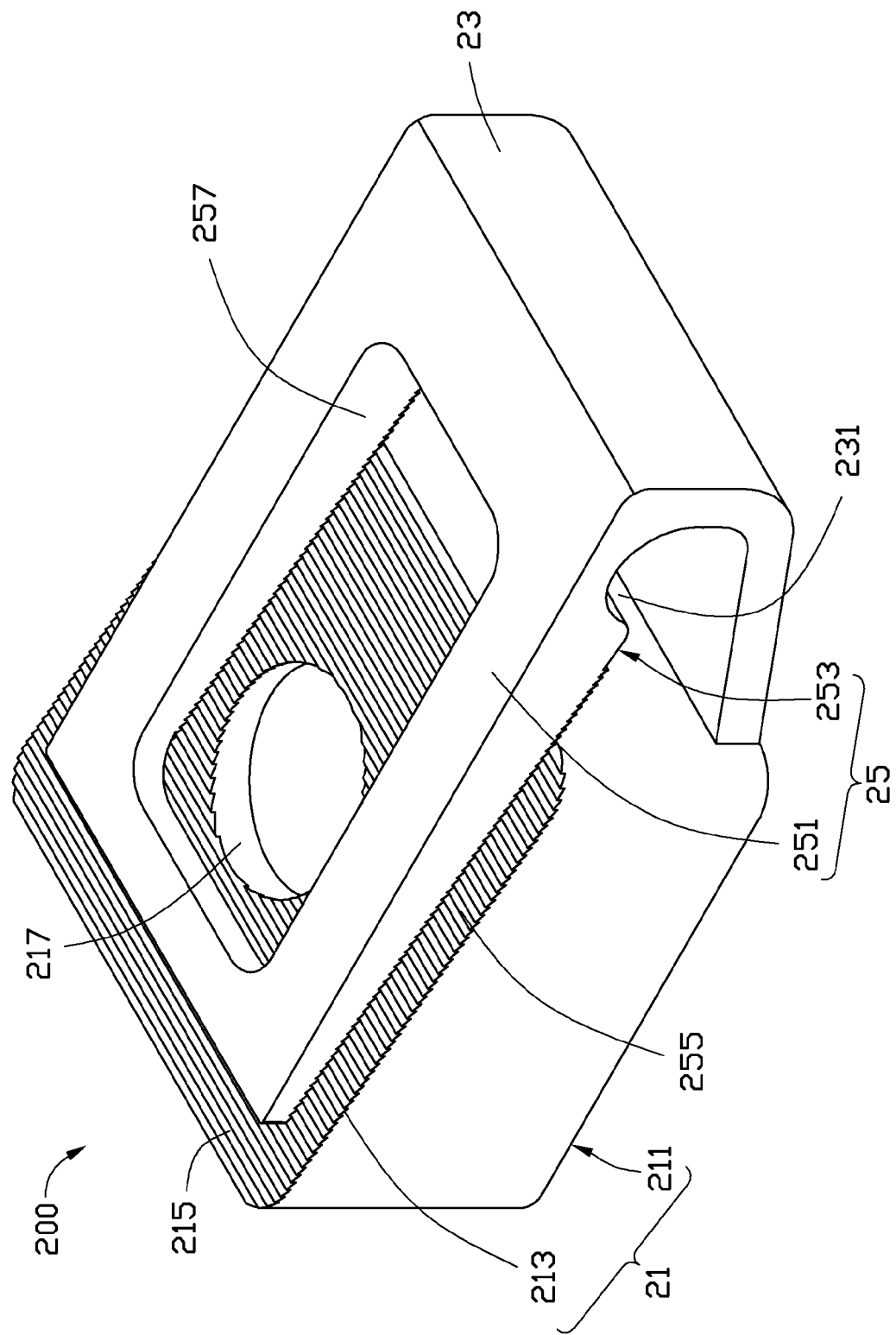
FIG. 1 is an isometric view of an embodiment of a washer.
Figure 2:
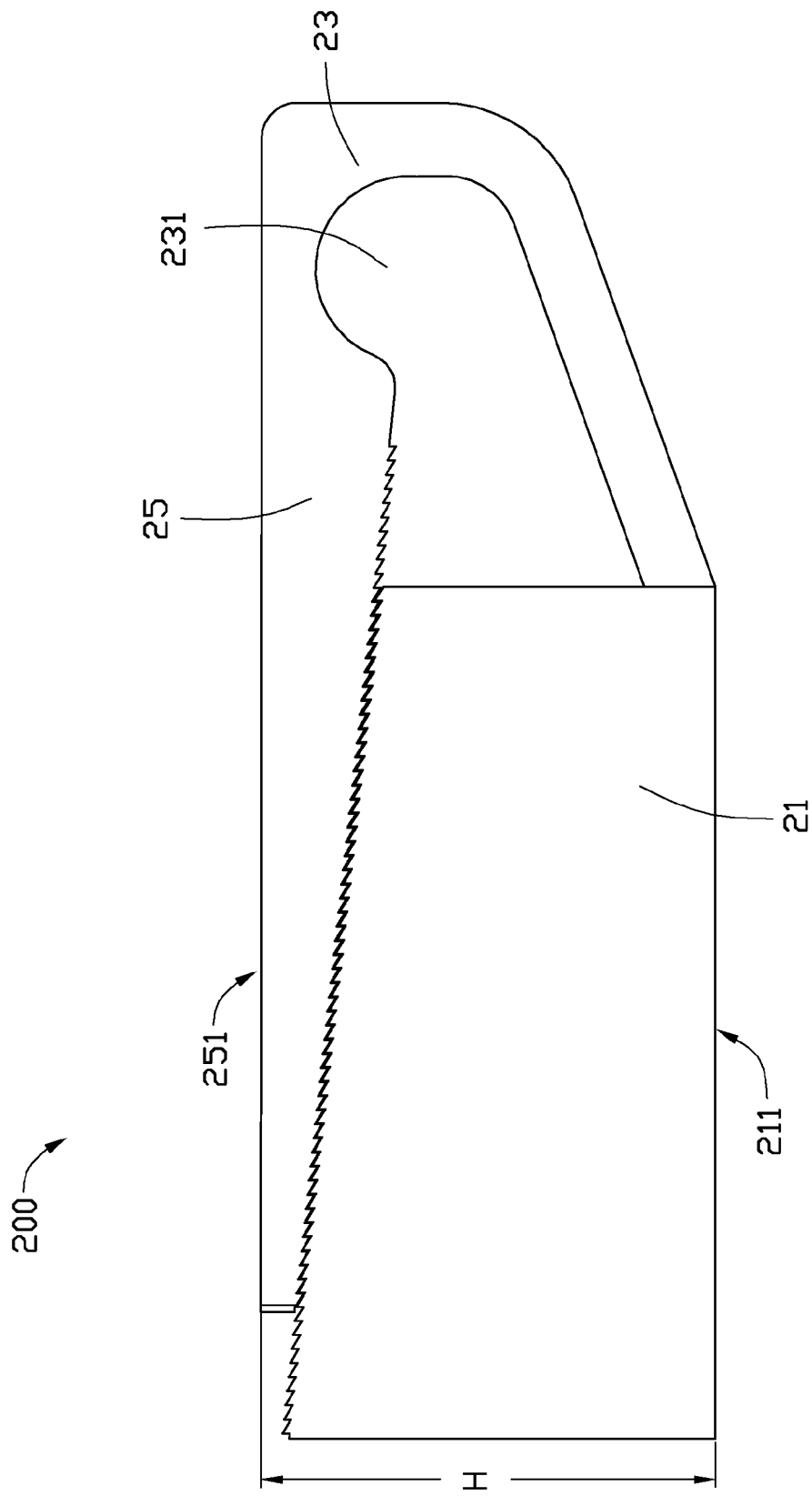
FIG. 2 is a side view of the washer shown in FIG. 1.

Referring to FIGS. 1 and 2, an exemplary embodiment of a washer 200 includes a main body 21, a connecting portion 23 and an adjusting portion 25. The connecting portion 23 interconnects the main body 21 and the adjusting portion 25. The main body 21 is substantially wedge-shaped, and a height of the main body 21 decreases towards the connecting portion 23. The main body 21 includes a bottom surface 211 and a positioning surface 213 as being a wedge surface opposite to the bottom surface 211. The positioning surface 213 is serrated and angled relative to the bottom surface 211. The positioning surface 213 forms a serrated pattern 215. The main body 21 defines a through hole 217 at a center thereof. In the illustrated embodiment, the through hole 217 is substantially circular.

The connecting portion 23 is a sheet extending from a side of the main body 21, and bending to the adjusting portion 25. The connecting portion 25 defines an arcuate groove 231 at a side surface adjacent to the adjusting portion 25 to enhance its flexibility.

The adjusting portion 25 is a substantially wedge-shaped sheet with the same wedge angle as the main body 21. A height of the adjusting portion 25 increases towards the connecting portion 23. The adjusting portion 25 includes a contact surface 251 and a latching surface 253 opposite to the contact surface 251. The contact surface 251 is flat. The latching surface 253 is serrated and angled relative to the contact surface 251, and forming a serrated pattern 255 corresponding to the serrated pattern 215 of the main body 21. The adjusting portion 25 defines a limiting hole 257 having a width substantially equal to the radius of the through hole 217, and a length exceeding the radius of the through hole 217.

The connecting portion 23 is flexible, thereby rendering the adjusting portion 25 moveable relative to the main body 21.

The adjusting portion 25 can be covered on the main body 21, with the serrated pattern 255 engaging with the serrated pattern 215 of the main body 21, thereby bending the connecting portion 23. The adjusting portion 25 may be detached from the main body 21 by disengaging the serrated pattern 255 of the adjusting portion 25 and the serrated pattern 215 of the main body 21, and covering the main body 21 again at another position of the positioning surface 213, such that the position of the adjusting portion 25 can be changed. Since the wedge angle of the adjusting portion 23 is equal to that of the main body 21, therefore, when the adjusting portion 23 is covered on the main body 21, the contact surface 251 of the adjusting portion 25 is parallel with the bottom surface 211 of the main body 21. A height H of the washer 200 is defined by a distance between the contact surface 251 and the bottom surface 211. The height H is adjustable according to the position of the adjusting portion 25.

Figure 3:
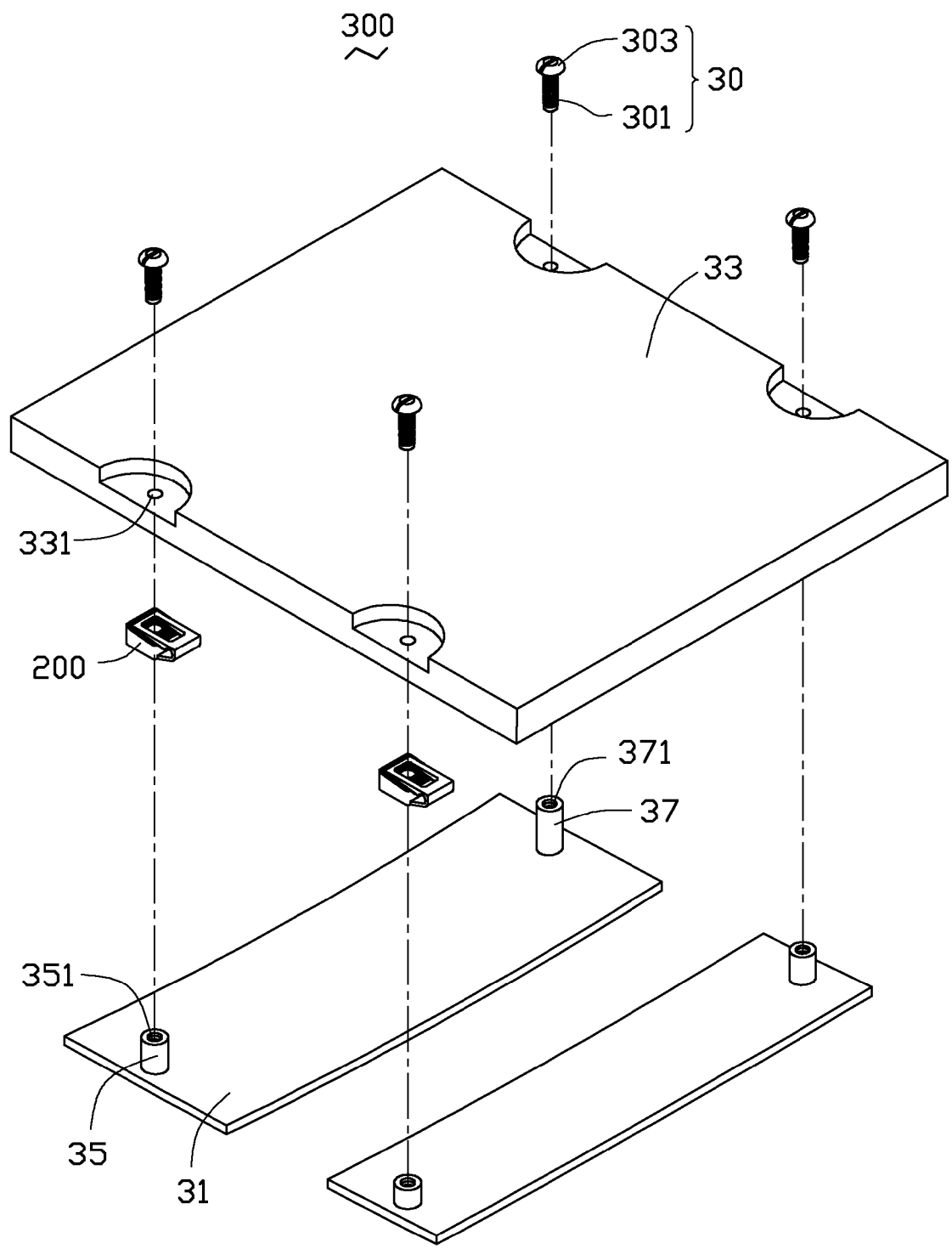
FIG. 3 shows an exploded assembly structure using the washer shown in FIG. 1.
Figure 4:
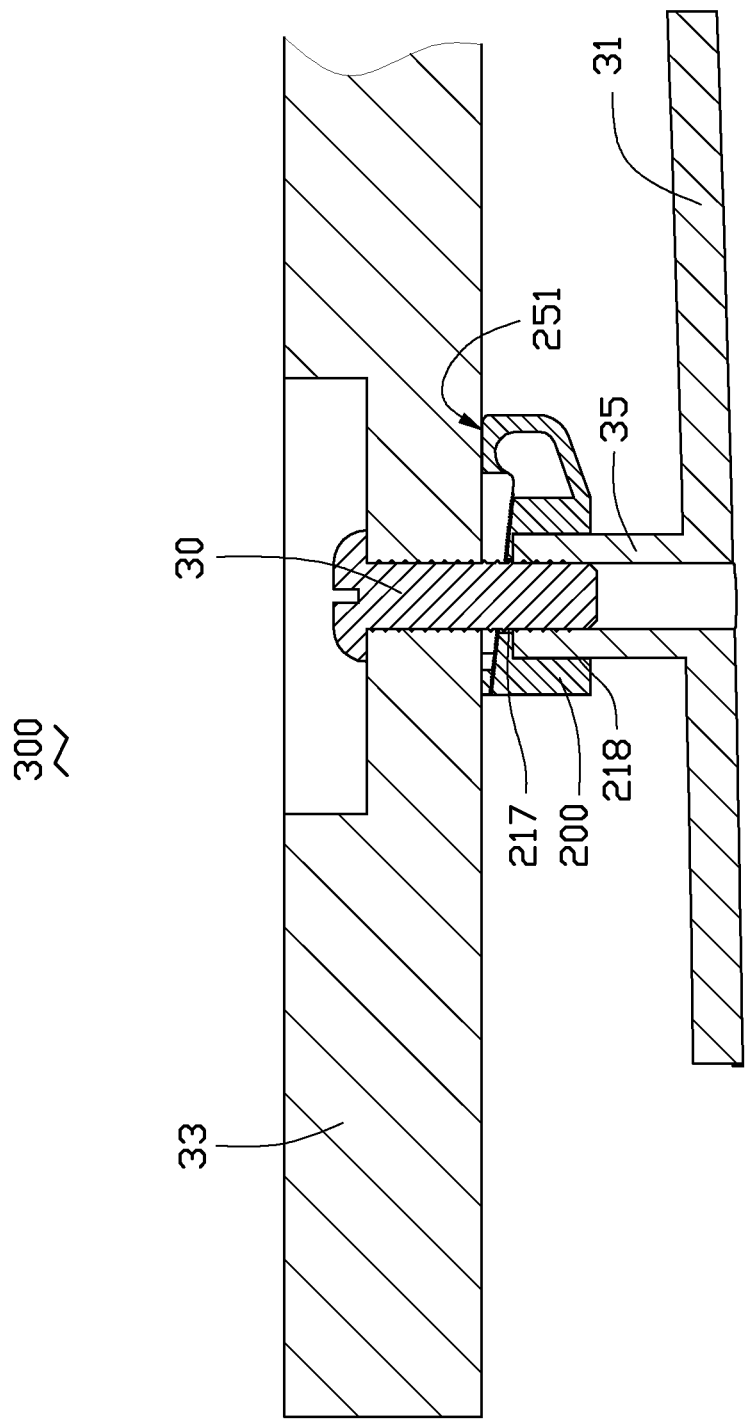
FIG. 4 is a cross section of the assembly structure shown in FIG. 3.

Also referring to FIGS. 3 and 4, two washers 200 may be employed for an assembly structure 300 of an electronic device. The assembly structure 300 includes a mounting board 31, a base body 33 of an electronic device, four screws 30, and two washers 200. The screw 30 includes a threaded post 301 and a head 303 at an end of the threaded post 301. The board 31 forms a first positioning post 35 and a second positioning post 37 spaced from the first positioning post 35 on a surface of the board 31. The first positioning post 35 defines a threaded hole 351 therein corresponding to the screw 30. The second positioning post 37 defines a threaded hole 371 the same as the threaded hole 351 of the first positioning post 35. The base body 33 defines a plurality of fixing holes 331 through which the screws 30 are passed through corresponding to the first positioning post 35 and the second positioning post 37, respectively. The first positioning post 35 may be slightly longer than the second positioning post 37 due to fabrication variance, whereby if the board 31 is mounted on the base body 33 of the electronic device directly, the board 31 would not be steady. Two washers 200 are employed, and each washer 200 is positioned on the first positioning post 35 of each board 31 to eliminate the height difference between the first positioning post 35 and the second positioning post 37. In assembly, the threaded post 303 of each screw 30 passes through the fixing hole 331 of the base body 33, the limiting hole 257 of the adjusting portion 25, a through hole 217 of the main body 21 in that order, and is received in the threaded hole 351 of the first positioning post 35, to mount the board 31 on the base body 33 of the electronic device. The connecting portion 23 is flexible, and the adjusting portion 25 is moveable on the main body 21; thus, the height H of the washer 200 can be adjusted according to the height difference between the first positioning post 35 and the second positioning post 37, to firmly fix the board 31. The main body 21 further defines a positioning hole 218 partly receiving the threaded post 303 at the bottom surface 211 communicating with the through hole 217. During assembly, when the washer 200 is positioned on the first positioning post 35, the first positioning post 35 is partly received in the positioning hole 218, to steady the washer 200.

Finally, while particular embodiments have been described, the description is illustrative and is not to be construed as limiting. For example, various modifications can be made to the embodiments by those of ordinary skill in the art without departing from the true spirit and scope of the invention as defined by the appended claims.

What is claimed is:

1. A washer comprising:
a main body defining a through hole, the main body substantially wedge-shaped and comprising a bottom surface and a positioning surface angled relative to the bottom surface;
an adjusting portion adjustably positioned on the main body, the adjusting portion substantially wedge-shaped and comprising a contact surface and a latching surface contacting the positioning surface of the main body, the latching surface angled relative to the contact surface, a wedge angle of the adjusting portion equal to that of the main body, such that the bottom surface of the main body is substantially parallel to the contact surface of the adjusting portion; and
a connecting portion interconnecting the main body and the adjusting portion, wherein a height of the main body decreases towards the connecting portion, and a height of the adjusting portion increases towards the connecting portion.

2. The washer of claim 1, wherein the positioning surface comprises a first serrated pattern thereon, and the latching surface of the adjusting portion forming a second serrated pattern, corresponding to the first serrated pattern of the main body.

3. The washer of claim 1, wherein the adjusting portion defines a limiting hole larger than the through hole of the main body.

4. The washer of claim 1, wherein the adjusting portion defines an arcuate groove adjacent to the adjusting portion.

* * * * *

UNITED STATES PATENT AND TRADEMARK OFFICE
CERTIFICATE OF CORRECTION

PATENT NO. : 8,434,986 B2  
APPLICATION NO. : 12/861044  
DATED : May 7, 2013  
INVENTOR(S) : Zi-Ming Tang Page 1 of 1

It is certified that error appears in the above-identified patent and that said Letters Patent is hereby corrected as shown below:

On the title page insert the following:

--(30)   Foreign Application Priority Data

November 25, 2009   (CN) ......................2009 1 0310379--

Signed and Sealed this  
Twenty-sixth Day of November, 2013

Margaret A. Focarino  
*Commissioner for Patents of the United States Patent and Trademark Office*